(12) United States Patent
Ibel et al.

(10) Patent No.: US 9,087,208 B2
(45) Date of Patent: Jul. 21, 2015

(54) PERSISTENT KEY ACCESS TO ALBUM

(75) Inventors: Maximilian Ibel, Palo Alto, CA (US);
Matthew S. Steiner, Mountain View, CA (US)

(73) Assignee: Google Inc., Mountain View, CA (US)

( * ) Notice: Subject to any disclaimer, the term of this patent is extended or adjusted under 35 U.S.C. 154(b) by 243 days.

(21) Appl. No.: 13/532,228

(22) Filed: Jun. 25, 2012

(65) Prior Publication Data
US 2012/0331529 A1  Dec. 27, 2012

Related U.S. Application Data

(60) Provisional application No. 61/501,642, filed on Jun. 27, 2011.

(51) Int. Cl.
*G06F 21/62* (2013.01)
*H04L 9/32* (2006.01)
*H04L 29/06* (2006.01)

(52) U.S. Cl.
CPC ............. *G06F 21/6218* (2013.01); *H04L 9/32* (2013.01); *H04L 63/102* (2013.01); *G06F 2221/2137* (2013.01); *G06F 2221/2145* (2013.10)

(58) Field of Classification Search
CPC . G06F 7/04; G06F 17/30047; G06F 21/6218; H04N 1/00196; H04L 9/32
USPC .......................................................... 726/4
See application file for complete search history.

(56) References Cited

U.S. PATENT DOCUMENTS

| | | | |
|---|---|---|---|
| 7,290,285 B2 * | 10/2007 | McCurdy et al. | 726/27 |
| 7,380,280 B2 * | 5/2008 | de Jong | 726/27 |
| 7,797,242 B2 * | 9/2010 | Gautier et al. | 705/52 |
| 7,895,445 B1 * | 2/2011 | Albanese et al. | 713/185 |
| 8,065,285 B2 * | 11/2011 | Svendsen et al. | 707/705 |
| 8,346,807 B1 * | 1/2013 | Diamond et al. | 707/783 |
| 8,474,028 B2 * | 6/2013 | Kulkarni et al. | 726/9 |
| 8,627,489 B2 * | 1/2014 | Herbach et al. | 726/27 |
| 8,788,425 B1 * | 7/2014 | Diamond et al. | 705/59 |
| 2002/0035697 A1 * | 3/2002 | McCurdy et al. | 713/200 |
| 2002/0036990 A1 * | 3/2002 | Chodor et al. | 370/262 |

(Continued)

FOREIGN PATENT DOCUMENTS

WO   2006127359 A2   11/2006

OTHER PUBLICATIONS

International Search Report, dated Dec. 18, 2012 for related PCT Application No. PCT/US2012/043961.

(Continued)

*Primary Examiner* — O. C. Vostal (57) ABSTRACT

A method includes receiving a first request from a first user device to access a first resource that includes data for a second user account for which access to the data is restricted to authorized users, the first request including an authorization token and associated with a first user identifier that identifies a first user; determining that the first user identifier does not identify an authorized user and in response: determining that the first user identifier identifies an authorized user based on the authorization token, and provide the first resource to the first user device; receiving a second request for access to data to the second user account, the second request associated with the first user identifier; and based on the first user identifier being determined to identify authorized user, providing access to the data to the second user account in response to the second request.

18 Claims, 7 Drawing Sheets

(56) References Cited

U.S. PATENT DOCUMENTS

| | | | |
|---|---|---|---|
| 2002/0111907 A1* | 8/2002 | Ling | 705/41 |
| 2003/0028892 A1* | 2/2003 | Gewickey et al. | 725/110 |
| 2004/0098313 A1* | 5/2004 | Agrawal et al. | 705/26 |
| 2004/0122958 A1 | 6/2004 | Wardrop | |
| 2005/0138421 A1* | 6/2005 | Fedronic et al. | 713/201 |
| 2005/0154923 A1* | 7/2005 | Lok et al. | 713/202 |
| 2006/0101508 A1* | 5/2006 | Taylor | 726/7 |
| 2006/0112188 A1 | 5/2006 | Albanese | |
| 2006/0117010 A1* | 6/2006 | Hakala | 707/9 |
| 2007/0226062 A1* | 9/2007 | Hughes et al. | 705/14 |
| 2008/0082903 A1* | 4/2008 | McCurdy et al. | 715/200 |
| 2008/0208963 A1* | 8/2008 | Eyal et al. | 709/203 |
| 2009/0058869 A1* | 3/2009 | Gustin et al. | 345/581 |
| 2009/0077248 A1* | 3/2009 | Castellucci et al. | 709/229 |
| 2009/0083847 A1 | 3/2009 | Fadell | |
| 2009/0172132 A1* | 7/2009 | Svendsen et al. | 709/219 |
| 2009/0235347 A1* | 9/2009 | Syed et al. | 726/10 |
| 2009/0271847 A1 | 10/2009 | Karjala | |
| 2009/0328177 A1 | 12/2009 | Frey | |
| 2010/0100950 A1* | 4/2010 | Roberts | 726/7 |
| 2010/0251353 A1* | 9/2010 | Hodgkinson | 726/9 |
| 2011/0093371 A1* | 4/2011 | Clemm et al. | 705/34 |
| 2011/0130112 A1* | 6/2011 | Saigh et al. | 455/404.1 |
| 2011/0225643 A1* | 9/2011 | Faynberg et al. | 726/10 |
| 2012/0003923 A1* | 1/2012 | Pazos et al. | 455/3.06 |
| 2012/0110318 A1* | 5/2012 | Stone | 713/150 |
| 2012/0197996 A1* | 8/2012 | Raman et al. | 709/204 |
| 2012/0198537 A1* | 8/2012 | Grube et al. | 726/9 |
| 2012/0265631 A1* | 10/2012 | Cronic et al. | 705/26.1 |
| 2012/0311036 A1* | 12/2012 | Huhn | 709/204 |
| 2012/0331518 A1* | 12/2012 | Lee | 726/1 |
| 2013/0145435 A1* | 6/2013 | Fu | 726/4 |
| 2013/0232563 A1* | 9/2013 | Ache et al. | 726/9 |
| 2013/0268680 A1* | 10/2013 | Marton et al. | 709/226 |

OTHER PUBLICATIONS

Menezes, Vanstone, Oorschot: •Handbook of Applied Cryptography•, 1997, CRC Press LC, USA.

Extended European Search Report mailed Feb. 20, 2015 in related European Application No. 12733565.1.

Examination Report mailed Feb. 19, 2015 in related Australian Application No. 2012275653.

* cited by examiner

300 http://www.example.com/photos/myphoto.jpg?off=12345
\_______________________/ \_____________/ \___/ \___/
          320                     330       340   310

PERSISTENT KEY ACCESS TO ALBUM

CLAIM OF PRIORITY

This application claims priority under 35 USC §119(e) to U.S. Provisional Patent Application Ser. No. 61/501,642, filed Jun. 27, 2011, the entire contents of which are hereby incorporated by reference.

BACKGROUND

This specification relates to computer data access management.

The digital age has made the creation and distribution of electronic information a part of daily life for many people. Users can create data repositories, electronic documents, digital multimedia files, or other forms of data and share them with other users. In some situations, users who share such data use access control features to limit or otherwise control access to the data by other users.

Users may control access to their data by specifying approved users, user accounts and/or passwords. For example, a user that has an account in a photograph management site for managing photographs on-line can specify particular users that can access the user's on-line photographs, or particular user accounts, and can further specify passwords that users must input before access can be granted. Such methods can provide the desired access control, but can also involve administration for adding and deleting user accounts, maintaining passwords, editing permissions, and other such administrative tasks. These tasks can become multiplied when the administering user wishes to independently control access to a number of files by a number of accessing users.

SUMMARY

This specification describes technologies relating to managing access to user data of a user and as specified by the user.

In general, one innovative aspect of the subject matter described in this specification can be embodied in methods that include the actions of receiving a first request from a first user device to access one photo album in a collection of photo albums for a second user account for which access to the photo album for the second user account is restricted to authorized users, the first request including an authorization token and associated with a first user identifier that identifies a first user; determining that the first user identifier does not identify an authorized user and in response: determining that the first user identifier identifies an authorized user for the one photo album of the second user account based on the authorization token and providing data from only the one photo album to the first user device; receiving a second request for access to the collection of photo albums of the second user account, the second request associated with the first user identifier; and based on the first user identifier being determined to identify authorized user for only the one photo album, provide access to only the one photo album of the second user account in response to the second request. Other embodiments of this aspect include corresponding systems, apparatus, and computer programs, configured to perform the actions of the methods, encoded on computer storage devices.

Another innovative aspect of the subject matter described in this specification can be embodied in methods that include the actions of receiving a first request from a first user device to access a first resource that includes data for a second user account for which access to the data for the second user account is restricted to authorized users, the first request including an authorization token and associated with a first user identifier that identifies a first user; determining that the first user identifier does not identify an authorized user and in response: determining that the first user identifier identifies an authorized user based on the authorization token, and providing the first resource to the first user device; receiving, by the data processing apparatus, a second request for access to data to the second user account, the second request associated with the first user identifier; and based on the first user identifier being determined to identify authorized user, providing access to the data to the second user account in response to the second request. Other embodiments of this aspect include corresponding systems, apparatus, and computer programs, configured to perform the actions of the methods, encoded on computer storage devices.

These and other embodiments can each optionally include one or more of the following features. Associating the authorization token with the first user identifier and store the association in an access control data store, receiving, from a second user identified by a second user identifier associated with the second user account, a revocation of the authorization token; and in response to receiving the revocation of the authorization token, determining that the first user identifier does not identify an authorized user to preclude access to the data by the first user.

Generating an access link to the first resource, the access link including a resource locator of the first resource and the authorization token; and providing the access link as a communication to an electronic account associated with the first user identifier. In some implementations, generating an access link to the first resource comprises: receiving, from a second user identified by a second user identifier associated with the second user account, the first user identifier and data indicating the that the first user is to be granted access to the first resource; generating a hash of the user identifier for use in the authorization token; and determining that the first user identifier identifies an authorized user based on the authorization token comprises: generating a hash of the first user identifier associated with the request; comparing the hash of the first user identifier associated with the request to the authorization token; and determining that the first user identifier identifies an authorized user only when the hash of the user identifier for use in the authorization token matches the hash of the first user identifier associated with the request.

Receiving respective third requests from respective second user devices to access the first resource that includes data for the second user account for which access to the data for the second user account is restricted to authorized users, each of the second requests including the authorization token and associated with respective third user identifiers that identify respective third users, and for each respective third request: determining that the respective third user identified by the respective third user identifier is not an authorized user and in response: determining that the respective third user identifier identifies an authorized user based on the authorization token; and providing the first resource to the respective second user device; receiving, by the data processing apparatus, a respective fourth request for access to data to the second user account, the respective fourth request associated with the respective third user identifier; and based on the respective third user identifier being determined to identify an authorized user, providing access to the data to the respective second user account in response to the respective fourth request.

Associating the authorization token with each of the respective third user identifiers and store the association in an access control data store; receiving, from an administrator of the section user account, a revocation of the authorization token; and in response to receiving the revocation of the authorization token, determining that each of the first user identifier and the respective third user identifiers do not identify an authorized user to preclude access to the data by the first user and the respective third users.

In some implementations, determining that the first user identifier identifies an authorized user based on the authorization token comprises determining that the first user identifier identifies an authorized user only in response to determining that the authorization token has not been previously used to identify an authorized user.

In some implementations, determining that the first user identifier identifies an authorized user based on the authorization token comprises determining that the first user identifier identifies an authorized user only in response to determining that the authorization token has not been used to identify more than a maximum number of other users as authorized users.

In some implementations, the authorization token is further associated with a set of other user identifiers, and wherein determine that the first user identifier identifies an authorized user based on the authorization token is further based on determining that the first user identifier is included in the set of user identifiers.

In some implementations, authorization token is associated with an expiration value that indicates a time period for which the authorization token is valid for use in the first request, and after which the authorization token cannot be used to determine that the first user identifier identifies an authorized user based on the authorization token.

Particular embodiments of the subject matter described in this specification can be implemented so as to realize one or more of the following advantages. A user can grant persistent access to other users when inviting users to view content maintained by the user simply by specifying persistent access be granted by use of an authorization token and a link to the user's content. By granting access in this manner, administrative steps that are typically required (e.g., specifying a particular user to receive access) can be eliminated, thereby improving the user experience. Furthermore, the user may specify whether the authorization token is specific for a particular user, or promiscuous for many users. In the case of the former, the user access can only be granted to the particular user, which allows the granting user to maintain access control in the event the link is distributed to others. In the case of the latter, the user need only publish the link to facilitate access for many users. In some implementations, access lists are generated for each corresponding authorization token, and if the user revokes an authorization token, access that has been granted to users by use of the revoked token is likewise revoked. This facilitates management of particular access lists, which may be advantageous if an authorization token (e.g., a promiscuous token) is published to users that the granting user did not intend to grant access. The granting user may also revoke access to a user who previous used the authorization token, thereby preventing previously authorized user from using the token again.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
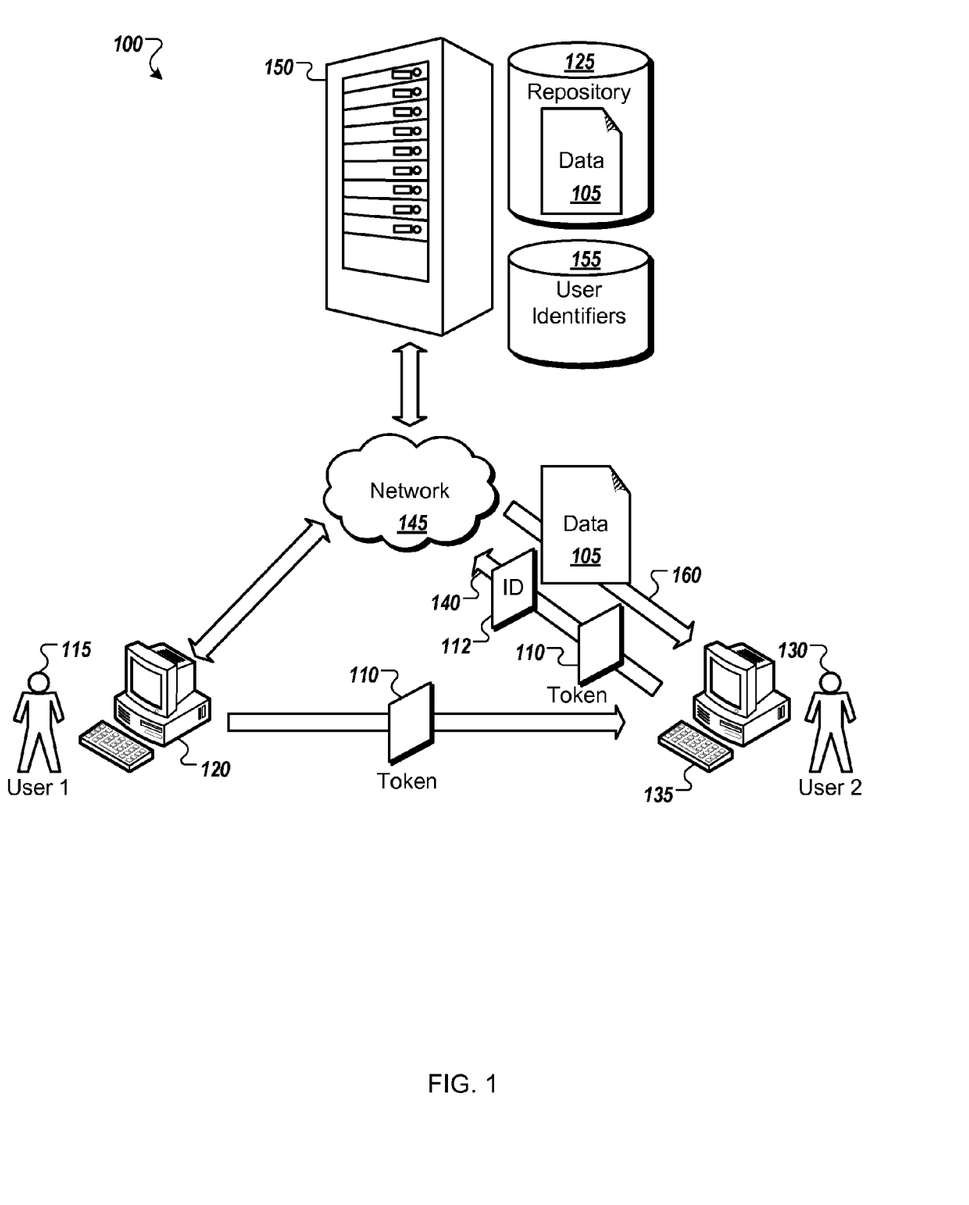
FIG. 1 is a schematic diagram of an example system for providing a persistent key for accessing data.

FIG. 1 is a schematic diagram of an example system 100 for providing a persistent key for accessing data. As used herein, a persistent key is data that is used by a user to be granted access to data for which the access persists beyond a single instance or session. In general, the system 100 provides a way for one user to grant access privileges for one or more other users to access electronic data 105 (e.g., electronic documents, digital photos, digital video, digital photo albums, folders of digital files) through a token 110. Although the examples described in this specification are directed to digital photographs, access to other types of digital content can be facilitated in a similar manner.

In some implementations, a first user can grant a second user access to a digital photo posted on a photo hosting service by providing the second user with a special hyperlink to the photo. The hyperlink includes the token 110, and references the photo hosting service. The token 110 is an authorization token that is used to grant the second user permission to view the photo. Once used by the second user, the photo hosting persists an association of an identifier of the second user with data indicating the user has been granted access to the photographic content. The association allows the second user to view the photo again later without the use of the token 110 or the special hyperlink.

Referring again to FIG. 1, a user 115 uses a client computer 120 to generate the token 110. The token can, in some implementations, be generated at the client computer; in other implementations, the token is generated by a data processing apparatus of the web site hosting the digital content (e.g., a server computer 150). In some implementations, the token 110 is a hash or other code that identifies the electronic data 105, a repository of data 125, or any other appropriate electronic data, resource, or collection of data (e.g., files, folders, categories, albums). In some implementations, the token 110 can also include or be derived (e.g., hashed) from the information that identifies a user 130.

Figure 3:
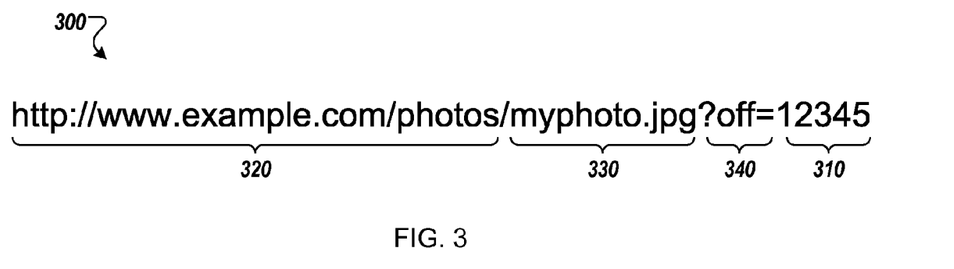
FIG. 3 illustrates an example uniform resource locator that includes a user access token.

The user 115 provides the token 110 to the user 130, e.g., by an e-mail or by instructing the server 150 to send a communication to the user 130. In some implementations, the token 115 is appended to a uniform resource locator (URL) or other form of network address that can be provided to the user 130 (e.g., copied into an email or text message string). An example of a URL that includes a token is discussed in the description of FIG. 3A.

The user 130 enters the token 110 into a computer application (e.g., a web browser, a file browser) executing on a computer 135 as part of a request 140 for the data 105. For example, the user 130 can click on the hyperlink (e.g., a URL that includes the token 110) to generate an HyperText Transfer Protocol (HTTP) request for the content the user 115 desires to share with the user 130.

The request 140 is transmitted over a network 145 (e.g., the Internet) to the server computer 150. In some implementations, the request includes a user identifier of the user making the request. The identifier 112 can be transmitted in a cookie, in the URL itself, or as part of the token 110. The identifier 112 may be obtained explicitly or implicitly. For example, the identifier 112 may be explicitly included in the request 140, e.g., by the user having been logged into a user account. Alternatively, the user 130 may provide the identifier 112 as part of an account login process for the client computer 135 or the server computer 150, and the request 140 may be automatically associated with the user's 130 account and/or identifier 112.

The server computer 150 determines whether the token 110 is valid for granting the user 130 access to the data 105. If the token 110 is valid, then the server computer 150 grants the request 140 by providing the data 105 as part of a response 160. The server computer 150 also associates the granted permission with the identifier 112 of the user 130, with the data 105, and/or with the repository of data 125. For example, the server computer 150 may store information in association with the data 105 to describe the identifiers of users who have been granted access through use of the token 105. In another example, the server computer 150 may store information in association with the identifier 112 (e.g., within the collection of user identifiers 155) to identify the data 105 and/or other data that the user 130 has been granted access to. In some implementations, the server computer 150 can instruct the computer 135 to remember that the user 130 has access to the data 105. For example, the server computer 150 can instruct the computer 135 to store the token in a client-side cookie with or without a cookie expiration date.

In some implementations, the token 110 may be valid for only one user or group of users. For example, the token 110 may include a hash of the use identifier 112. In response to the request 140, the server computer 150 compares the token 110 to a hash of the identifier 112 associated with the request to determine whether the token 110 is valid for the user 130. If the token is valid, then the server 150 associates the user identifier with an authorization list (e.g., stores the user identifier in an authorization list) to identify the user 130 as being a user that is authorized to view content of the user's 115 account. To identify a group of users, the token 112 may include a hash of each identifier, or, alternatively, may include a reference to a list of identifier that is accessible by the server 150.

With the permissions associated between the user 130 and the data 105, the user 130 can make subsequent requests 140 for the data 105 without providing the token 110. In these subsequent requests, the server computer 150 determines if the user 130 associated with the identifier 112 has been previously granted permission to access the data 105, and if so, grants the subsequent requests by providing the data 105.

In some implementations, the token 110 may be made valid for a predetermined period of time. For example, the user 130 may be required to first use the token 110 within 30 days of issuance, after which the server computer 150 will not grant permission to access the data 105 or associate such permission with the user 130. In another example, the user 130 may be required to use the token during a predefined 5-day period in the future (e.g., during a professional conference), before and/or after which the token 110 may be rejected.

In some implementations, the token 110 may be a one-time-use token. For example, the server computer 150 may grant the request 140, based upon the token 110, and grant future requests from the user 130. The server 150 then stores the token in an expired token list. Thereafter, the server computer 150 denies subsequent requests from other uses based upon the same token 110 by checking the token 110 against the expired token list.

The user 115 may interact with the server computer 150 at a later time to revoke permissions associated with the token 110. For example, the user 115 can delete the token 110 from the server computer 150, and the server computer 150 can respond by removing permissions that had been previously granted between the data 105/user account of the user 115 and user identifiers, based on the token 110.

Figure 2:
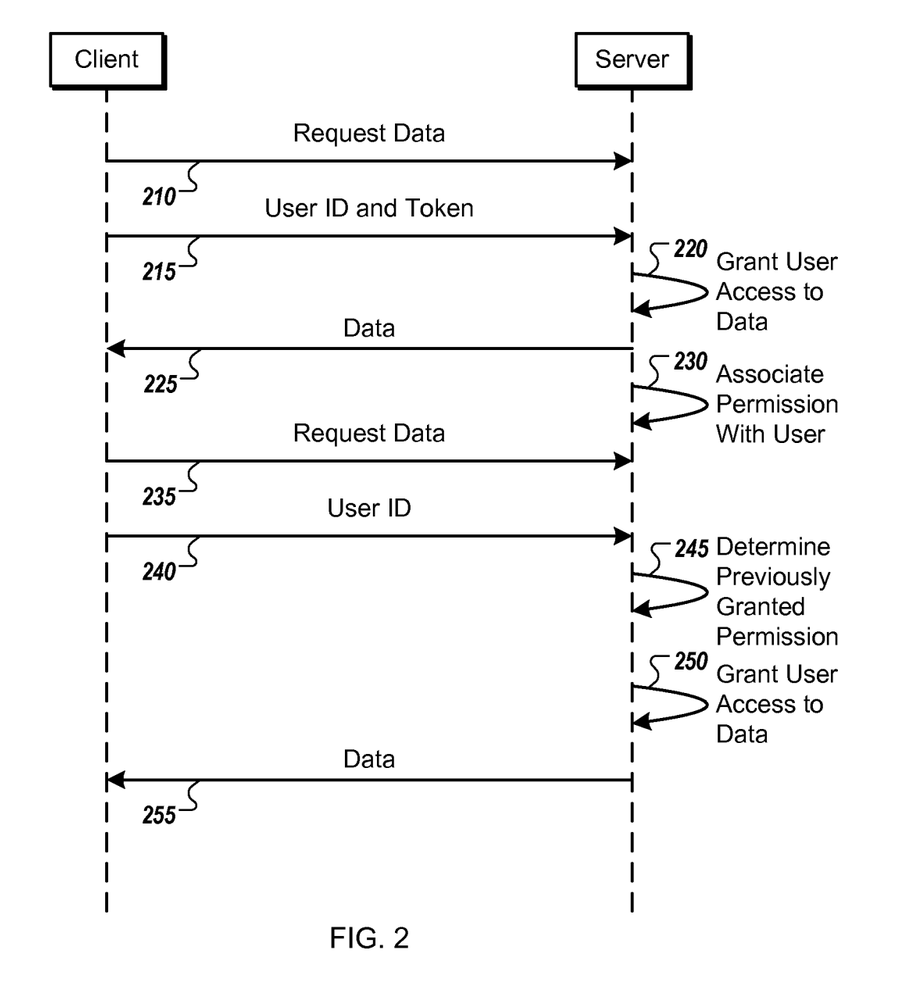
FIG. 2 is a sequence diagram of example interactions between a client and a server for providing a persistent key for accessing data.

FIG. 2 is a sequence diagram of example interactions 200 between a client computer 202 and a server computer 204 for providing persistent key access to data. In some implementations, the client computer 202 can be the client computer 135, and the server computer 204 can be the server computer 150 of FIG. 1.

The client computer 202 issues a request 210 for data (e.g., the data 105). The client computer 202 also sends a transmission 215 that includes a user identifier (e.g., the identifier 112) and a token (e.g., the token 110). For example, the request can be an HTTP request that is generated by accessing a link that was sent to the client computer 202.

The server computer 204 determines that the token and/or combination of the token and user identifier correspond to the requested data, and grants 220 the identified user access to the data. The data is then provided to the client computer 202 in a transmission 225.

The client computer 202 issues a subsequent request 235 for the data, and a transmission 240 that includes the user identifier without the token. For example, after the user views a first photo in response to the request 210, the user may request to view another photo from the same user account.

The server computer 204 determines 245 that the identified user has been previously granted permission to access the data of the user account, and thus responds by sending the data to the client computer in a transmission 255.

FIG. 3 illustrates an example uniform resource locator (URL) 300 that includes a user access token 310. Use of a URL with the token attached as a query parameter is one example way in which a user can grant access to content to another user. Other appropriate communication protocols can also be used to facilitate access to user content.

The URL 300 includes a location address 320 and a file identifier 330. The URL 300 also includes a key 340 and the token 310. In use, the key 340 and the token 310 together form a query string field-value pair that a server computer (e.g., the server computer 150) processes to determine whether to grant access to the file 330 based upon permissions granted by the token 310. In some implementations, the URL 300 can be provided as the request 210 in transmission 215 of FIG. 2. In some implementations, the file identifier 330 may be omitted. For example, the URL 300 may be the address of a folder, photo album, or other resource to which access is granted by the token 310.

Figure 4:
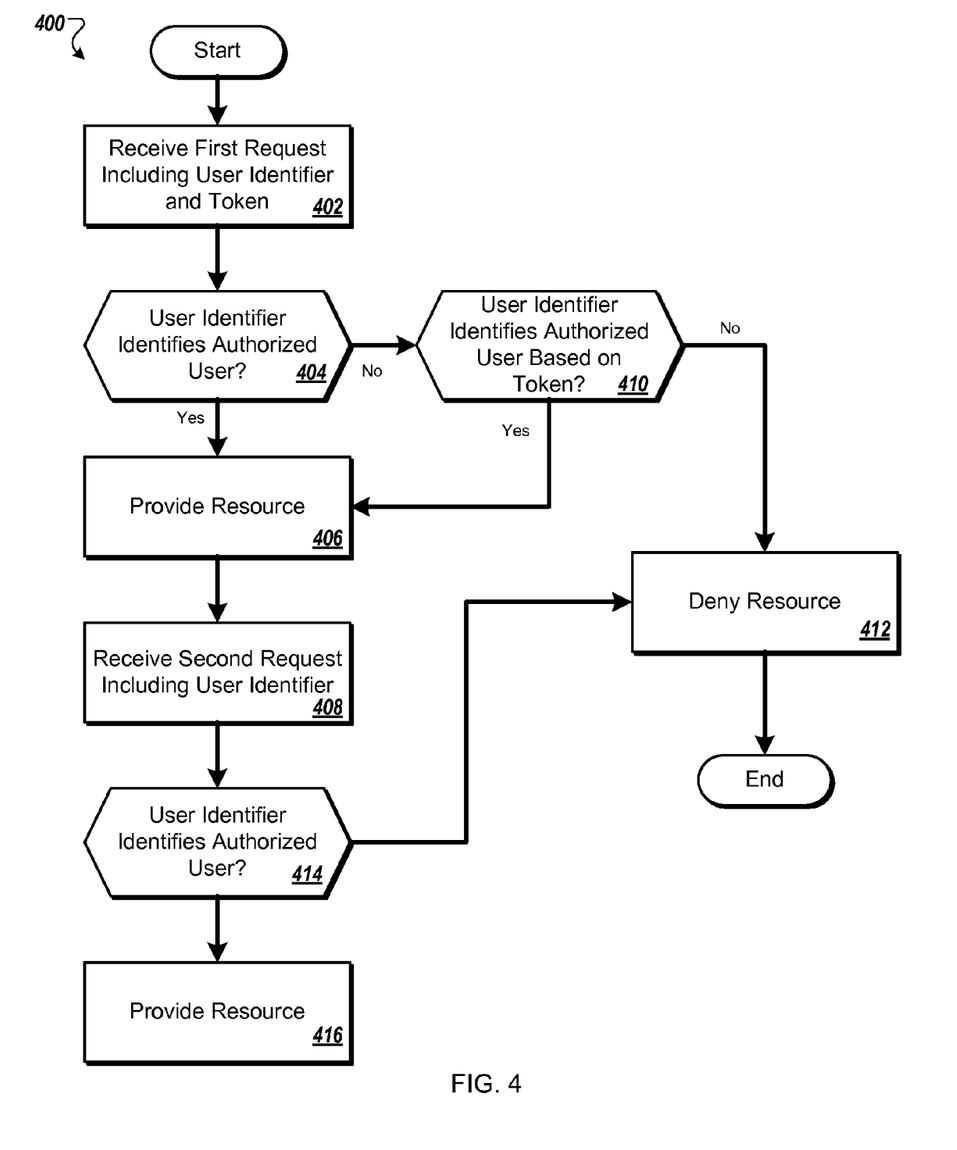
FIGS. 4-6 are flow diagrams of example processes for providing a persistent key for accessing data.
Figure 5:
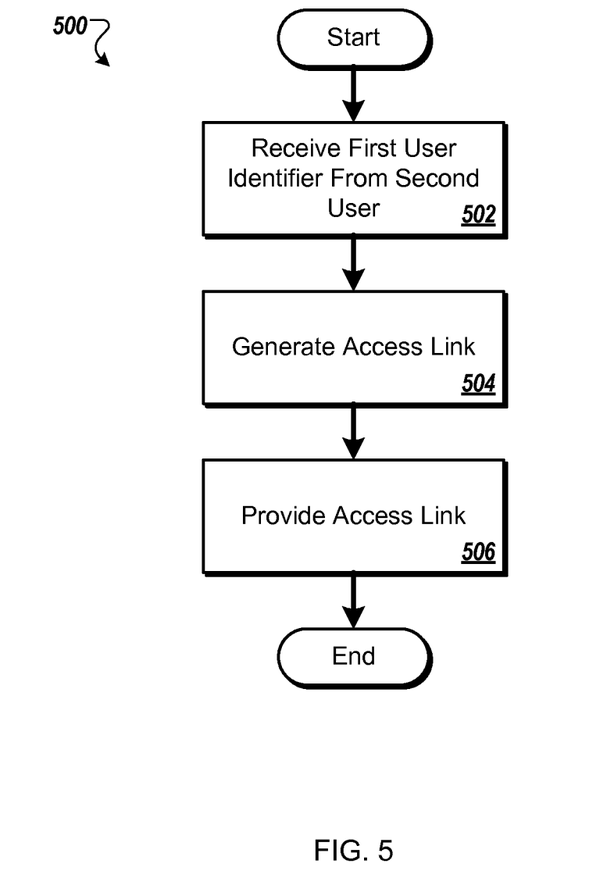
Figure 6:
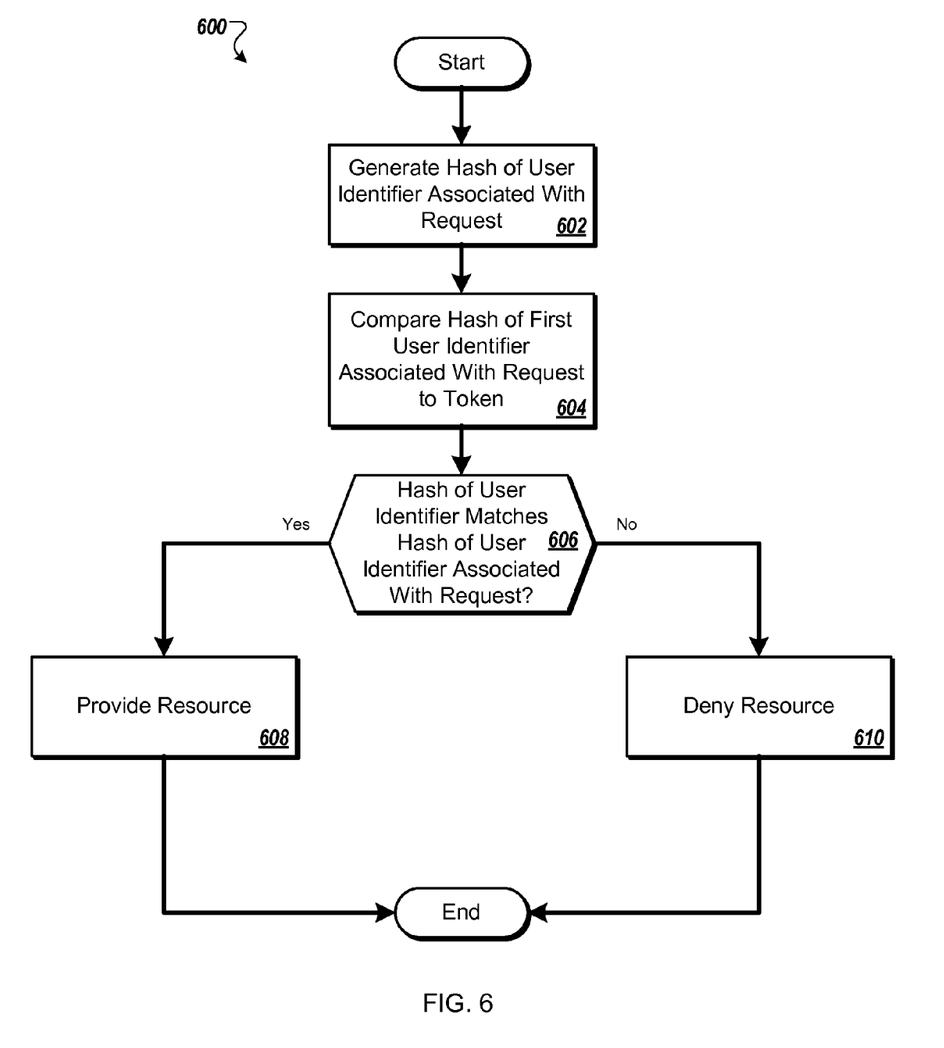

FIGS. 4-6 are flow charts of example processes for providing a persistent key for accessing data. In some implementations, the processes discussed in the descriptions of FIGS. 4-6 can be performed by the server computer 150 of FIG. 1 or the server computer 204 of FIG. 2. Referring to FIG. 4, an example process 400 begins at step 402 when a first request is received from a first user device to access a first resource. In some implementations, the first resource can be a file (e.g., a digital photo or video), a folder (e.g., a photo album or document collection) a web page, or any other appropriate online resource that one user can share with another. The first request can include data for a second user account to which access to the data for the second user account is restricted to authorized users. For example, the first resource can include a photograph of a second user's on-line photo album, and be referenced by a URL to the photograph. The first request includes an authorization token and is associated with a first user identifier that identifies a first user. For example, the server computer 150 can receive request 140 from the client computer 135, and the request 140 can include the token 110. The request is also associated with the identifier 112, e.g., the first user identifier is provided with the request to identify the requestor.

Step 404 determines if the user identifier identifies an authorized user. An authorized user is a user (identified by a user identifier) that has been authorized access to the content of the second user's second user account. For example, the server computer may access an access control list that list user identifiers of authorized users. If in step 404 it is determined that the first user identifier identifies an authorized user, then the requested resource is provided. For example, the server computer 150 can provide the data 105 to the client computer 135.

If step 404 determines that the first user identifier does not identify an authorized user, then at step 410 the process 400 determines if the user identifier identifies an authorized user based on the token. The determination of step 410 can be done in a variety of appropriate ways, and is described in more detail below.

If at step 410 it is determined that the first user identifier identifies an authorized user based on the authorization token, then the requested resource is provided at step 406. Otherwise the request is denied at step 412.

At step 408, a second request for access to data to the second user account is received. The second request does not, however, include an authorization token. Accordingly, step 414 determines if the user is an authorized user based on the user identifier. For purposes of illustration, assume the second request is associated with the first user identifier. For example, the first user may have typed in the URL at a later time, or may have requested a different photo from the second user's account. Because the first user identifier has been determined to identify an authorized user, the requested resource is provided in step 416.

However, assume that the second request does not identify an authorized user. Because there is no token with the request by which the system can determine whether the user should be identified as an authorized user, the request is denied in step 412.

In some implementations, the process 400 can also include steps for associating the authorization token with the first user identifier and store the association in an access control data store. This allows the second user to manage access control based on authorization tokens the second user has published. For example, a second user may have sent a promiscuous authorization token to a family member identified by a first user identifier, expecting that the family member would only distribute the link and token to other family members, each of which are identified by respective third user identifiers. However, assume the content of the user's account includes a humorous video, and the family member distributes the link to other individuals, and the link thereafter goes viral. Thus, multiple other third user identifiers may be determined to identify authorized users. To manage such situations, the first user, by means of a user interface, can view the number of users that have been granted access by use of particular authorization tokens. If the user notices that many other users have been granted access to the user's account, then the user can simply revoke the authorization token, which, in turn, revokes the access to the account for each user identifier that was granted access to the user's account using the now revoked token.

For example, the user 115 can revoke the token 110 to cause the server computer 150 to deny subsequent requests for the data 105 by the user 130. Thus, the server computer, upon receiving a revocation of the authorization token, determines that the first user identifiers associated with that token do not identify authorized users and precludes access to the data by those users.

In some implementations, revocation of a particular authorization token does not affect the access status of other user identifiers associated with other authorization tokens. For example, if a user published two authorization tokens, and revokes one of the tokens, only the access status of the user identifiers that used the revoked token to be granted access to the user's account are changed. In some implementations, if a user identifier is included in two or more access lists associated with respective authorization tokens, and one of the authorization tokens is revoked, the status of the user identifier is not changed, as it is still listed in the other authorization lists associated with other tokens that have not been revoked.

In variations of these implementations, authorization tokens can also be associated with a particular subset of content of the user account. For example, a user may have multiple sets of content, e.g., virtual photo albums. With each set of content, the user can specify a corresponding token that grants access to only the particular set of content, and does not grant access to other sets of content. For example, a user may have a collection of family vacation photos, and a collection of work-related photos. The user may send a link to the family photos with a corresponding token to his family members, and may send another link to the collection of work-related photos to work colleagues. The family members will only be granted access to the family photos, and the work colleagues will only be granted access to the work-related photos.

How the determination of step 410 is done depends on the type of token used. Example authorization token types include promiscuous, specific, time limited, and use limited. For example, if the token is promiscuous, then any user identifier provided with the request will become an authorized user. Alternatively, if the token is specific (e.g., designated for only one user identified by a particular user identifier, or a set of users identified by a set of user identifiers), then only the specific user identifier will result in a determination that the identifier identifies an authorized user. For example, the process 400 can also include steps for the associating the authorization token with a set of user identifiers (e.g., a user may specify that the token is associated only with the user's family members, as identified in a profile). Thus, the user identifier associated with a request is determined to identify an authorized user only if the user identifier is included in the set of user identifiers.

For use limited tokens, where the use is limited to N grants of access (e.g., N=1, 2, 3 or some other value), the step 410 can determine the first user identifier identifies an authorized user only in response to determining that the authorization token has not been previously used to identify an authorized user in excess of N times. For example, the token 110 can be a single use token in which the first user who uses the token 110 to request the data 105 will be granted access and subsequent access, and another user who tries to use the token 110 will be denied access.

For time limited tokens, the authorization token of the process 400 can be associated with an expiration value that indicates a time period for which the authorization token is valid for use in the first request, and after which the authorization token cannot be used to determine that the first user identifier identifies an authorized user based on the authorization token. For example, the token 110 can be valid for authorizing the user's 130 request 140 for a predetermined period of time, such as 60 days.

An authorization token can also be a combination of types, e.g., promiscuous and time limited; specific and time limited; promiscuous, time limited and use limited; etc. The user may specify such parameters when generating the token.

FIG. 5 is a flow chart of an example process for generating an access link that includes an authorization token. The example process 500 is used to generate a specific token for a particular user identifier.

The process 500 begins at step 502 when a first user identifier and data indicating that the first user is to be granted access to the first resource is received. For example, the user 115 can use the client computer 120 to interact with the server computer 150 to indicate that the user 130 is to be granted access to the data 105.

At step 504, an access link to the first resource is generated. The access link includes a resource locator of the first resource and the authorization token. For example, the URL 300 can be generated, which includes a resource locator made up of the location address 320 and the file identifier 330, and the authorization token 310. The server computer 150 generates a hash of the first user identifier for use in the authorization token. For example, the authorization token 310 may be the hash of the first user identifier, or may include the hash of the first user identifier and other data (e.g., a hash of the URL, or a hash of the content (e.g., a hash of the image file) that is referenced by the URL.

At step 506, the access link is provided as a communication to an electronic account associated with the first user identifier. For example, the user 115 may send the link as an e-mail to an e-mail account of the second user 130. In another example, the user 115 may send the link as a text or instant message, as a written (e.g., paper message) that the user 130 can type into the computer 135, or sent in any other appropriate form that can transport the token to the user 130.

FIG. 6 is a flow chart of an example process for determining whether a request is associated with an authorized user using the token generated by the process of FIG. 5. The process 600 begins at step 602, at which a hash of the first user identifier associated with the request is generated. For example, upon receiving the request from a user device when a user selects the URL link, the server computer 150 generates a hash of the user identifier associated with the request. As describe above, the user identifier can be obtained explicitly or implicitly.

At step 604 the hash of the first user identifier associated with the request is compared to the authorization token, and step 608 determines if the first user identifier identifies an authorized user based on the comparison. For example, when the hash of the user identifier for use in the authorization token matches the hash of the first user identifier associated with the request, then step 608 determines that first user identifier identifies an authorized user. Accordingly, at step 610 the resource is provided. Otherwise, if the hashes do not match, then at step 612 the access to the resource is denied.

Although described in the context of digital photographs, the features of this disclosure not limited to digital photographs, and can be used to access for other types of containers or collections of resources, e.g., video playlists, audio playlists, webpages within a website, or other containers owned by a user.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. A computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Figure 7:
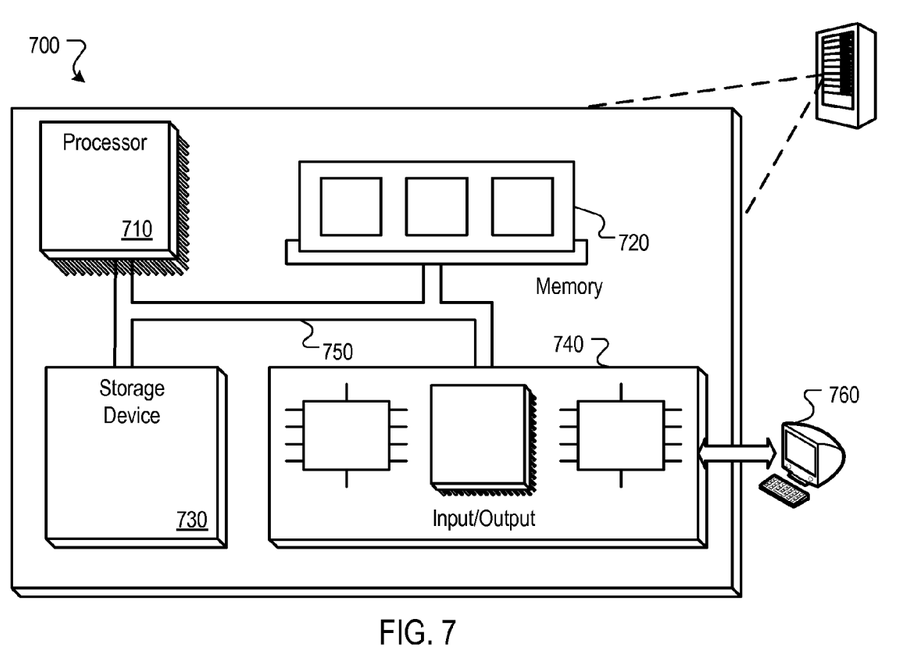
FIG. 7 is a schematic diagram of an example computer system.

An example of one such type of computer is shown in FIG. 7, which shows a block diagram of a programmable processing system (system) 710 suitable for implementing apparatus or performing methods of various aspects of the subject matter described in this specification. The system 700 includes a processor 710, a memory 720, a storage device 730, and an input/output device 740. Each of the components 710, 720, 730, and 740 can, for example, be interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 can, for example, include a hard disk device, an optical disk device, or some other large capacity storage device.

The input/output device 740 provides input/output operations for the system 700. In one implementation, the input/output device 740 can include one or more of a network interface device, e.g., an Ethernet card, a serial communication device, e.g., and RS-232 port, and/or a wireless interface device. In another implementation, the input/output device can include driver devices configured to receive input data and send output data to other input/output devices, e.g., keyboard, printer and display devices 760.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system, comprising:
a data processing apparatus including one or more computers;
a computer-readable medium coupled to the data processing apparatus and storing instructions executable by the data processing apparatus and that when executed by the data processing apparatus cause the data processing apparatus to perform operations comprising:
receive, by the data processing apparatus, a first request associated with a first user identifier and a first user account from a first user device to access one photo album in a collection of photo albums of a second user account for which access to the one photo album of the second user account is restricted to authorized users, the first request including a uniform resource locator (URL) including an authorization token, wherein the authorization token includes a hash of token data that includes the first user identifier, and wherein the authorization token is associated with an expiration value that indicates a time period for which the authorization token is valid for use in the first request, and after which the authorization token cannot be used to determine that the first user identifier identifies an authorized user based on the authorization token;
determine that the first user identifier does not identify an authorized user for the one photo album of the second user account based on the first user account and in response:
determine that the first user identifier identifies an authorized user for the one photo album of the second user account based on the authorization token;
store in an access list that the first user identifier identifies an authorized user for the one photo album of the second user account based on the authorization token; and
provide album data from only the one photo album to the first user device;
receive, by the data processing apparatus, a second request for access to the collection of photo albums of the second user account, the second request associated with the first user identifier; and
based on the first user identifier being determined to identify an authorized user for only the one photo album based on the access list, provide access to only the one photo album of the second user account in response to the second request.

2. The system of claim 1, wherein the instructions cause the data processing apparatus to:
associate the authorization token with the first user identifier and store the association in an access control data store;
receive, from a second user identified by a second user identifier associated with the second user account, a revocation of the authorization token; and
in response to receiving the revocation of the authorization token, determine that the first user identifier does not identify an authorized user.

3. The system of claim 1, wherein the instructions cause the data processing apparatus to:
generate an access link to the photo album, the access link including the uniform resource locator (URL) of the photo album and the authorization token; and
provide the access link as a communication to an electronic account associated with the first user identifier.

4. The system of claim 3, wherein:
generating an access link to the photo album comprises:
receiving, from a second user identified by a second user identifier associated with the second user account, the first user identifier and data indicating that the first user is to be granted access to the photo album;
generating a hash of token data including the first user identifier for use in the authorization token; and
determining that the first user identifier identifies an authorized user based on the authorization token comprises:
generating a hash of comparison data including the first user identifier associated with the request;
comparing the hash of the comparison data including the first user identifier associated with the request to the authorization token; and
determining that the first user identifier identifies an authorized user only when the hash in the authorization token matches the hash of the comparison data including the first user identifier associated with the request.

5. The system of claim 1, wherein determining that the first user identifier identifies an authorized user based on the authorization token comprises determining that the first user identifier identifies an authorized user in response to determining that the authorization token has not been previously used to identify an authorized user.

6. The system of claim 1, wherein the token data also includes a third user identifier.

7. A system, comprising:
a data processing apparatus including one or more computers;
a computer-readable medium coupled to the data processing apparatus and storing instructions executable by the data processing apparatus and that when executed by the data processing apparatus cause the data processing apparatus to perform operations comprising:
receive, by the data processing apparatus, a first request associated with a first user identifier and a first user account from a first user device to access a photo album resource of a second user account for which access to the photo album resource of the second user account is restricted to authorized users, the first request including a uniform resource locator (URL) including an authorization token, wherein the authorization token includes a hash of token data, the token data including the first user identifier, and wherein the authorization token is associated with an expiration value that indicates a time period for which the authorization token is valid for use in the first request, and after which the authorization token cannot be used to determine that the first user identifier identifies an authorized user based on the authorization token;
determine that the first user identifier does not identify an authorized user for the photo album resource based on the first user account and in response:
determine that the first user identifier identifies an authorized for the photo album resource based on the authorization token;
store in an access list that the first user identifier-identifies an authorized user for the photo album resource based on the authorization token; and
provide the photo album resource to the first user device;
receive, by the data processing apparatus, a second request for access to the photo album resource of the second user account, the second request associated with the first user identifier, the second request not including the authorization token; and based on the first user identifier being determined to identify an authorized user in the access list, provide access to the the photo album resource of the second user account in response to the second request.

8. The system of claim 7, wherein the instructions cause the data processing apparatus to:
associate the authorization token with the first user identifier and store the association in an access control data store;
receive, from a second user identified by a second user identifier associated with the second user account, a revocation of the authorization token; and
in response to receiving the revocation of the authorization token, determine that the first user identifier does not identify an authorized user.

9. The system of claim 7, wherein the instructions cause the data processing apparatus to:
generate an access link to the photo album resource, the access link including the uniform resource locator (URL) of the photo album resource and the authorization token; and
provide the access link as a communication to an electronic account associated with the first user identifier.

10. The system of claim 9, wherein:
generating an access link to the photo album resource comprises:
receiving, from a second user identified by a second user identifier associated with the second user account, the first user identifier and data indicating that the first user is to be granted access to the photo album resource;
generating a hash of token data including the first user identifier for use in the authorization token; and
determining that the first user identifier identifies an authorized user based on the authorization token comprises:
generating a hash of comparison data including the first user identifier associated with the request;
comparing the hash of the comparison data including the first user identifier associated with the request to the authorization token; and
determining that the first user identifier identifies an authorized user only when the hash in the authorization token matches the hash of the comparison data including the first user identifier associated with the request.

11. The system of claim 7, wherein determining that the first user identifier identifies an authorized user based on the authorization token comprises determining that the first user identifier identifies an authorized user in response to determining that the authorization token has not been previously used to identify an authorized user.

12. The system of claim 7, wherein the token data also includes a third user identifier.

13. A computer-implemented method performed by a data processing apparatus, the method comprising:
receiving, by a data processing apparatus, a first request from a first user device and associated with a first user identifier and a first user account to access a photo album resource of a second user account for which access to the photo album resource for the second user account is restricted to authorized users, the first request including a uniform resource locator (URL) including an authorization token, wherein the authorization token includes a hash of token data that includes the first user identifier, and wherein the authorization token is associated with an expiration value that indicates a time period for which the authorization token is valid for use in the first request, and after which the authorization token cannot be used to determine that the first user identifier identifies an authorized user based on the authorization token;
determining, by the data processing apparatus, that the first user identifier does not identify an authorized user for the photo album resource based on the first user account and in response:
determining that the first user identifier identifies an authorized user for the photo album resource based on the authorization token;
storing in an access list that the first user identifier identifies an authorized user for the photo album resource based on the authorization token, and
providing the photo album resource to the first user device;
receiving, by the data processing apparatus, a second request for access to the photo album resource of the second user account, the second request associated with the first user identifier; and
based on the first user identifier being determined to identify an authorized user in the access list, providing, by the data processing apparatus, access to the photo album resource of the second user account in response to the second request.

14. The method of claim 13, further comprising:
associating the authorization token with the first user identifier and storing the association in an access control data store;
receiving, from a second user identified by a second user identifier associated with the second user account, a revocation of the authorization token; and
in response to receiving the revocation of the authorization token, determining that the first user identifier does not identify an authorized user.

15. The method of claim 13, further comprising:
generating an access link to the photo album resource, the access link including the uniform resource locator (URL) of the photo album resource and the authorization token; and
providing the access link as a communication to an electronic account associated with the first user identifier.

16. The method of claim 15, wherein:
generating an access link to the photo album resource comprises:
receiving, from a second user identified by a second user identifier associated with the second user account, the first user identifier and data indicating the that the first user is to be granted access to the photo album resource;
generating a hash of the token data including the user identifier for use in the authorization token; and
determining that the first user identifier identifies an authorized user based on the authorization token comprises:
generating a hash of comparison data including the first user identifier associated with the request;
comparing the hash of the comparison data including the first user identifier associated with the request to the authorization token; and
determining that the first user identifier identifies an authorized user only when the hash in the authorization token matches the hash of the comparison data including the first user identifier associated with the request.

17. The method of claim 13, wherein determining that the first user identifier identifies an authorized user based on the authorization token comprises determining that the first user identifier identifies an authorized user only in response to determining that the authorization token has not been previously used to authorize any user.

18. The method of claim 13, wherein the token data that includes the first user identifier also includes a third user identifier.

* * * * *